United States Patent [19]

Endo

[11] Patent Number: 5,323,164

[45] Date of Patent: Jun. 21, 1994

[54] SATELLITE RADIO WAVE CAPTURING METHOD FOR A GLOBAL POSITIONING SYSTEM (GPS) RECEIVER

[75] Inventor: Isao Endo, Kawagoe, Japan

[73] Assignee: Pioneer Electronic Corporation, Tokyo, Japan

[21] Appl. No.: 26,050

[22] Filed: Mar. 5, 1993

[30] Foreign Application Priority Data

Mar. 16, 1992 [JP] Japan .................................. 4-058000
Mar. 18, 1992 [JP] Japan .................................. 4-061995
Apr. 1, 1992 [JP] Japan .................................. 4-080001

[51] Int. Cl.$^5$ ........................... H04B 7/185; G01S 5/02
[52] U.S. Cl. ..................................... 342/357; 455/12.1
[58] Field of Search ......................... 342/357; 455/12.1

[56] References Cited

U.S. PATENT DOCUMENTS 5,081,462  1/1992  Tachita et al. ...................... 342/352
5,119,101  6/1992  Barnard .............................. 342/357
5,177,490  1/1993  Ando et al. ......................... 342/357

FOREIGN PATENT DOCUMENTS 0447978  9/1991  European Pat. Off. .

OTHER PUBLICATIONS

Patent Abstracts of Japan, vol. 016, No. 136 (P-133) Jul. 4, 1992.

Primary Examiner—Theodore M. Blum

Attorney, Agent, or Firm—Foley & Lardner

[57] ABSTRACT

A satellite radio wave capturing method of a GPS receiver, in which an offset value of an oscillator of the GPS receiver is calculated by subtracting a Doppler frequency deviation of the first captured satellite radio wave from an actual received frequency of the first captured satellite radio wave, and with respect to the second and subsequent satellite radio waves to be captured, the search center frequencies are reset by using the calculated offset value, and an oscillating frequency of the oscillator is changed by using the set search center frequency as a reference, thereby capturing the radio wave of the target satellite. The elapsed time which is required from the power-OFF at the preceding position measurement by the GPS receiver to the power-ON at the present position measurement is measured. In accordance with the duration of the measured elapsed time, a determination is made to see whether or not the offset value of the oscillator which has been obtained at the preceding position measurement and stored in a memory in the GPS receiver is used as an offset value of the oscillator at the present position measurement. The mean value of a plurality of offset values obtained within a predetermined time just after the power-ON of the GPS receiver is calculated and stored. At the next power-ON of the receiver, the stored mean value of the offset values is used as an initial offset value at the start of the position measurement.

3 Claims, 8 Drawing Sheets

SATELLITE RADIO WAVE CAPTURING METHOD FOR A GLOBAL POSITIONING SYSTEM (GPS) RECEIVER

BACKGROUND OF THE INVENTION

1. Field of the Invention

The present invention relates to a method of capturing satellite radio waves by using an oscillator of a low accuracy in a GPS receiver.

2. Description of the Related Background Art

A GPS (Global Positioning System) is a position measuring system using artificial satellites. According to the GPS, six orbits which circulate the earth are set in the sky of an altitude of about 20200 km, a plurality of artificial satellites are put onto the orbits, and GPS signals including navigation data for measuring the position are transmitted to the earth from the satellite by a spread spectrum system. The radio waves of three or four satellites which are necessary to measure the position are received by a GPS Receiver on the ground (or sea or air), thereby enabling position information such as latitude, altitude, and the like at the signal received position which are necessary to be processed in a real-time manner by using the navigation data included in the GPS signal from each of the satellites.

The GPS signal which is released to the private citizen is a signal called a C/A code and is transmitted at a frequency of 1575.42 MHz. The capture the satellite radio wave, therefore, it is sufficient for the receiver to be in a standby mode at the frequency of 1575.42 MHz, in principle. Since the GPS satellite is not a geostationary satellite, however, the received frequency is fluctuated due to a Doppler effect and, further, an oscillating frequency of the oscillator of the GPS receiver is also fluctuated due to an offset.

To actually capture the satellite radio wave, therefore, a search center frequency of the satellite radio wave is set by deviating the frequency by a frequency corresponding to only the deviation amount of the received frequency due to the Doppler effect (hereinafter, such deviation amount is referred to as a "Doppler frequency deviation") and an offset amount of the oscillator. The search center frequency is set to a start point and the satellite is searched while gradually widening the search band width. At a time point when the oscillator is locked to the satellite radio wave, the capture of the relevant satellite radio wave is completed. By repeating such a capturing operation, the respective radio waves from satellites of the number which are necessary for position measurement are captured.

In the capturing operation of the satellite, as the search center frequency becomes closer to the actual received frequency of the satellite radio wave, the time which is required to capture the satellite radio wave decreases more and more. Main factors to set the search center frequency are the Doppler frequency deviation and the offset value of the oscillator. The Doppler frequency deviation is a phenomenon which inevitably occurs due to the earth circulating motion of the satellite and its value (up to a maximum of about ±6 kHz) can be previously obtained from the orbit data of the satellite and the schematic present location data. To set the search center frequency to a value which is as close to the actual received frequency as possible, it is desirable to reduce an error of the offset value of the oscillator of the GPS receiver to be as small as possible.

For this purpose, the conventional GPS receiver uses a crystal oscillator (hereinafter, referred to as "TCXO") with an accuracy compensation of an extreme high accuracy as an oscillator. According to the TCXO, by compensating the temperature characteristic of a quartz resonator by an electric circuit, an extremely high accuracy of a range of about ±2 to ±5 [ppm] (about ±3 to ±8 [kHz] as a frequency) is given in a wide temperature range of −40° to +85° C. An accuracy of the oscillator which is used in an ordinary communicating apparatus generally lies with a range of about ±50 to ±100 [ppm], preferably, about ±20 [ppm].

In the conventional GPS receiver, since the TCXO of a high accuracy is used, the value obtained at the time of the preceding position measurement is stored (backed up) into a memory in the receiver as an offset value of the oscillator of the GPS receiver, and the stored offset value is read out at the time to start the next capturing operation of the satellite radio wave and is used. When the user tries to use an oscillator of a low accuracy, since a change in the offset value is large, the backup value obtained at the preceding position measurement cannot be used as it is. To capture the satellite radio wave, it is necessary to search a desired satellite over a fairly wide frequency range, so there is a problem in that it takes a long time to capture the satellite radio wave.

Since the conventional GPS receiver uses the TCXO of a high accuracy, the aging change of the offset value is ignored and even after the first satellite radio wave was captured, the searching operation of another satellite is continued without updating the offset value. In the case where the initial set offset value has largely been changed due to some causes, therefore, even when the TCXO of the high accuracy is used, the satellite radio wave cannot be captured so long as the satellite radio frequency is not searched over a wide frequency range. It takes a fairly long time to capture radio waves from a plurality of satellites which are necessary for position measurement.

The TCXO used in the conventional GPS receiver, further, is very expensive as compared with a crystal oscillator of a low accuracy which is used in an ordinary communicating apparatus. The use of such an expensive TCXO exerts a large influence on the manufacturing costs of the GPS receiver.

SUMMARY OF THE INVENTION

The present invention is made on the basis of the above circumstances and it is an object of the invention to provide a satellite radio wave capturing method of a GPS receiver, in which even in case of using an oscillator of a low accuracy, a whole capturing time of a plurality of satellite radio waves which are necessary for position measurement can be reduced.

Another object of the invention is to provide a satellite radio wave capturing method of a GPS receiver, in which even in case of using an oscillator of a low accuracy, the offset value obtained at the preceding position measurement and backed up in a memory is effectively used and a satellite radio wave can be promptly captured.

Still another object of the invention is to provide a satellite radio wave capturing method of a GPS receiver, in which even in the case where the offset value of an oscillator which has been backed up in a memory cannot be used as an initial offset value at the start of the next position measurement as in the case where an oscillator of a low accuracy is used or the like, a search center frequency can be set to a value which is nearer to an actual received frequency.

To accomplish the above objects, according to the first aspect of the present invention, there is provided a satellite radio wave capturing method of a GPS receiver in which a search center frequency is set every satellite radio wave to be captured and the set search center frequency is used as a start point and a radio wave of a target satellite is captured while shifting an oscillating frequency of an oscillator in the GPS receiver to high and low frequency sides, wherein an offset value of the oscillator is calculated by subtracting a Doppler frequency deviation of the target satellite from the actual received frequency of the satellite radio wave which has first been captured, and the search center frequency is again set by using the calculated offset value with respect to the second and subsequent satellite radio waves to be captured.

According to the second aspect of the present invention, there is provided a GPS receiver which sets a search center frequency by using an offset value of an oscillator and a Doppler frequency deviation of a target satellite, wherein an elapsed time which is required from the power-OFF of the GPS receiver at the preceding position measurement to the power-ON of the GPS receiver at the present position measurement is measured, and determination is made to see if the offset value of the oscillator at the preceding position measurement stored in a memory in the GPS receiver is used as an offset value of the oscillator at the present position measurement or not on the basis of the duration of the elapsed time measured.

The offset value of the oscillator of a low accuracy largely changes depending on the ambient temperature. For instance, in the case where the power source of the GPS receiver is ON, circuit elements or the like generate heats, so that a temperature of the whole receiver including the oscillator is also generally high in correspondence to such heat generation. When the power source of the receiver is turned off, the temperature also drops with the elapse of time. When the change in offset value of the oscillator is, therefore, regarded as a function of the elapsed time from the power-OFF of the GPS receiver, it is possible to presume whether the offset value of the oscillator at the preceding position measurement which has been backed up in the memory can be used as an offset value of the oscillator for the present position measurement as it is or not on the basis of the duration of the elapsed time.

The second aspect of the present invention is made by paying an attention to the above point and whether the offset value of the oscillator obtained at the preceding position measurement is used as an offset value at the present position measurement or not is determined by the elapsed time which is required from the power-OFF of the GPS receiver at the preceding position measurement to the power-ON at the present position measurement. Even in case of using the oscillator of a low accuracy, therefore, the offset value at the preceding position measurement which has been backed up in the memory is effectively used and the search center frequency and the initial search band width can be set and the capturing time of the satellite radio wave can be reduced.

According to the third aspect of the present invention, there is provided a GPS receiver in which a search center frequency to capture a satellite is set by using the offset value of the oscillator and the Doppler frequency deviation of the satellite, wherein the mean value of a plurality of offset values obtained within a predetermined time just after the turn-on of the power source of the receiver is calculated and stored, and when the power source is subsequently turned on, the mean value of the offset values stored is used as an initial offset value at the start of the position measurement.

Since there is no internal heat generation or the like just after the power-ON, it is considered that a temperature state in the receiver hardly changes every time. The mean value, accordingly, of a plurality of offset values calculated within a predetermined time (for instance, about five minutes) just after the power-ON of the GPS receiver is calculated and stored and, at the next power-ON, the search center frequency is set by using the mean value. Due to this, the search center frequency can be set to a value which is nearer to the actual received frequency as compared with the case of setting the offset value to "0" because the offset value of the oscillator is obscure.

Various method can be used to calculate the mean value of the offset values. As a simplest method, for example, there is a method of obtaining an arithmetic mean of a plurality of offset values calculated within a predetermined time just after the power-ON. In case of the arithmetic mean obtaining method, since the reliability rises as the number of data is large, such a method is effective when the memory of the receiver has an enough capacity. As another example, there is a smoothing method whereby a certain weight (for instance, 0.2) is added to the newly obtained offset value and the resultant weighted offset value is added to the past value which has been weighted (for example, weight of 0.8). In case of the smoothing method, an amount of data to be stored can be reduced.

As a method of deciding which values should be used as offset values to obtain the means value, for instance, it is also possible to use any one of various kinds of methods such as method whereby the mean value is calculated by using all of the offset values calculated within the predetermined time after the power-ON, method whereby the means value is calculated by using some of the offset values calculated within the predetermined time after the power-ON, method whereby the offset value calculated at the first time within the predetermined time after the power-ON is regarded as a mean value and is used, and the like.

DETAILED DESCRIPTION OF PREFERRED EMBODIMENT

Embodiment of the present invention will now be described in detail hereinbelow with reference to the drawings.

Figure 1:
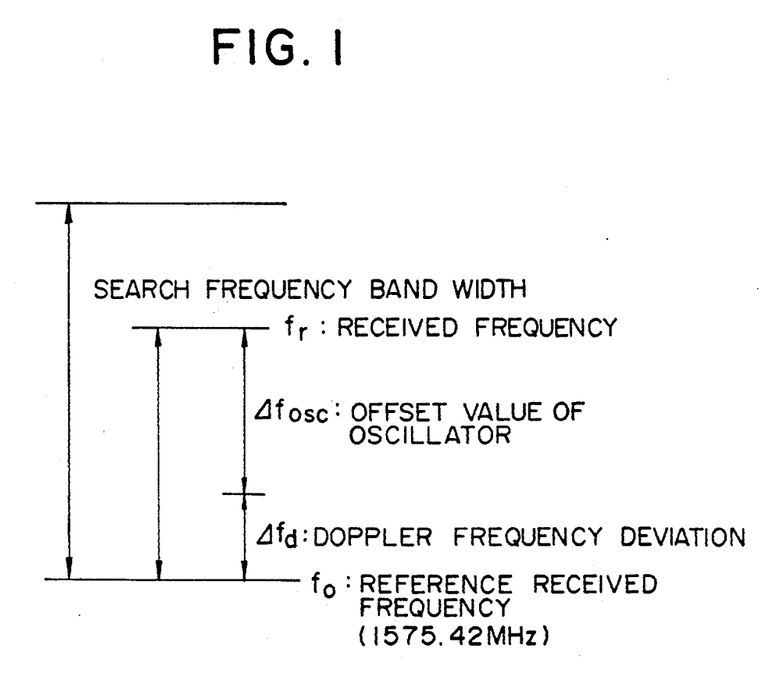
FIG. 1 is an explanatory diagram of a switching operation of a search frequency according to the first aspect of the present invention.

FIG. 1 is an explanatory diagram of a method of calculating an offset value of an oscillator for a satellite radio wave capturing method according to the first aspect of the present invention. It is now assumed that
$f_0$: (1575.42 MHz) Reference received frequency of a GPS signal
$f_r$: Actual received frequency of the satellite radio wave which has been captured at the first time
$\Delta f_d$: Doppler frequency deviation of the first satellite radio wave captured
$\Delta f_{OSC}$: Offset value of an oscillator of a GPS receiver There are the following relations among them as shown in the diagram.

As will be obviously understood from FIG. 1, the accurate offset value $\Delta f_{OSC}$ of the oscillator can be obtained as follows by subtracting the Doppler frequency deviation $\Delta f_d$ of the captured satellite radio wave from the actual received frequency $f_r$.

$$\Delta f_{OSC} = f_r - \Delta f_d - f_0$$

In the above equation, the Doppler frequency deviation $\Delta f_d$ can be obtained by a calculation from orbit data of the satellite and present value data of the GPS receiver. Almanac information or the like obtained at the preceding position measurement can be used as orbit data of the satellite. Since an extremely coarse value can be used as present position data of the GPS receiver, the result of the position measurement obtained at the preceding position measurement can be also used.

When the accurate offset value $\Delta f_{OSC}$ of the oscillator is calculated by the above equation, therefore, it is sufficient to reset a search center frequency $f_S$ of each satellite after that by the following equation.

$$f_S = f_0 + \Delta f_d + \Delta f_{OSC}$$

where,
$f_0$: Reference received frequency (1575.42 MHz)
$\Delta f_d$: Doppler frequency deviation of the satellite radio wave to be captured At a tie point when the first satellite radio wave is captured as mentioned above, by resetting the search center frequency $f_S$ of each satellite by using the offset value $\Delta f_{OSC}$ of the oscillator derived, the search center frequency $f_S$ of each satellite is set to a value which is extremely close to the actual received frequency $f_r$ of each satellite since the accurate offset value is used. Therefore, each satellite radio wave can be captured in a short time and even in the case where the oscillator of a high accuracy as in the conventional apparatus is not used, the radio waves from the satellites of the number which are necessary for the position measurement can be captured at a high speed.

Since the accurate offset value $\Delta f_{OSC}$ is not calculated yet until the first satellite radio wave is captured, it is sufficient to, for instance, use the offset value obtained at the preceding position measurement as it is or to search in a wide band while setting the offset value of the oscillator to "0" until the first satellite radio wave is captured.

As factors of an error of the offset value $\Delta f_{OSC}$ of the oscillator calculated as mentioned above, two errors such as error of the present position of the GPS receiver and the error of orbit data of the satellite can be mentioned. With respect to the error of the present position, however, even when the GPS receiver moves from Hokkaido to Kyushu in Japan, its calculation error is at most about 2 [kHz] and is enough smaller than an offset error (as a frequency, about ±80 to ±160 [kHz]) of a quartz oscillator of a low accuracy (about ±50 to ±100 [ppm]) and, accordingly, such a calculation error can be ignored so long as the system is used in Japan.

With respect to the error by the orbit data of the satellite, a problem will hardly occur by using none of the orbit data which is old to a certain degree. Even in the case where a large error occurs due to some causes, after the calculation was once executed by using such erroneous data, by again executing the calculation by using the latest orbit data derived from the capture satellite radio wave, such a large error can be corrected at a time point when the new orbit data is obtained.

Figure 2:
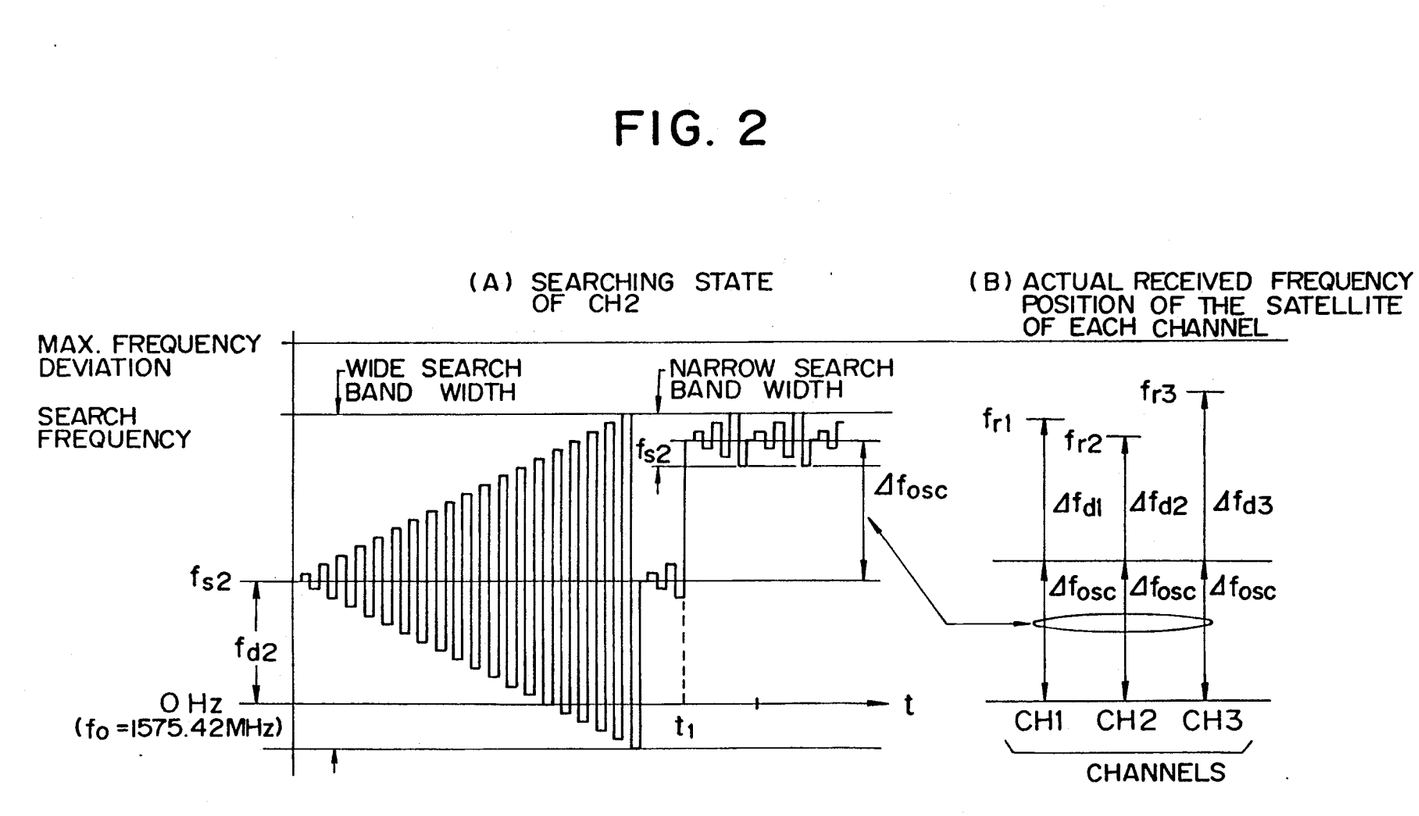
FIG. 2 is a flowchart showing an embodiment according to the first aspect of the invention.
Figure 3:
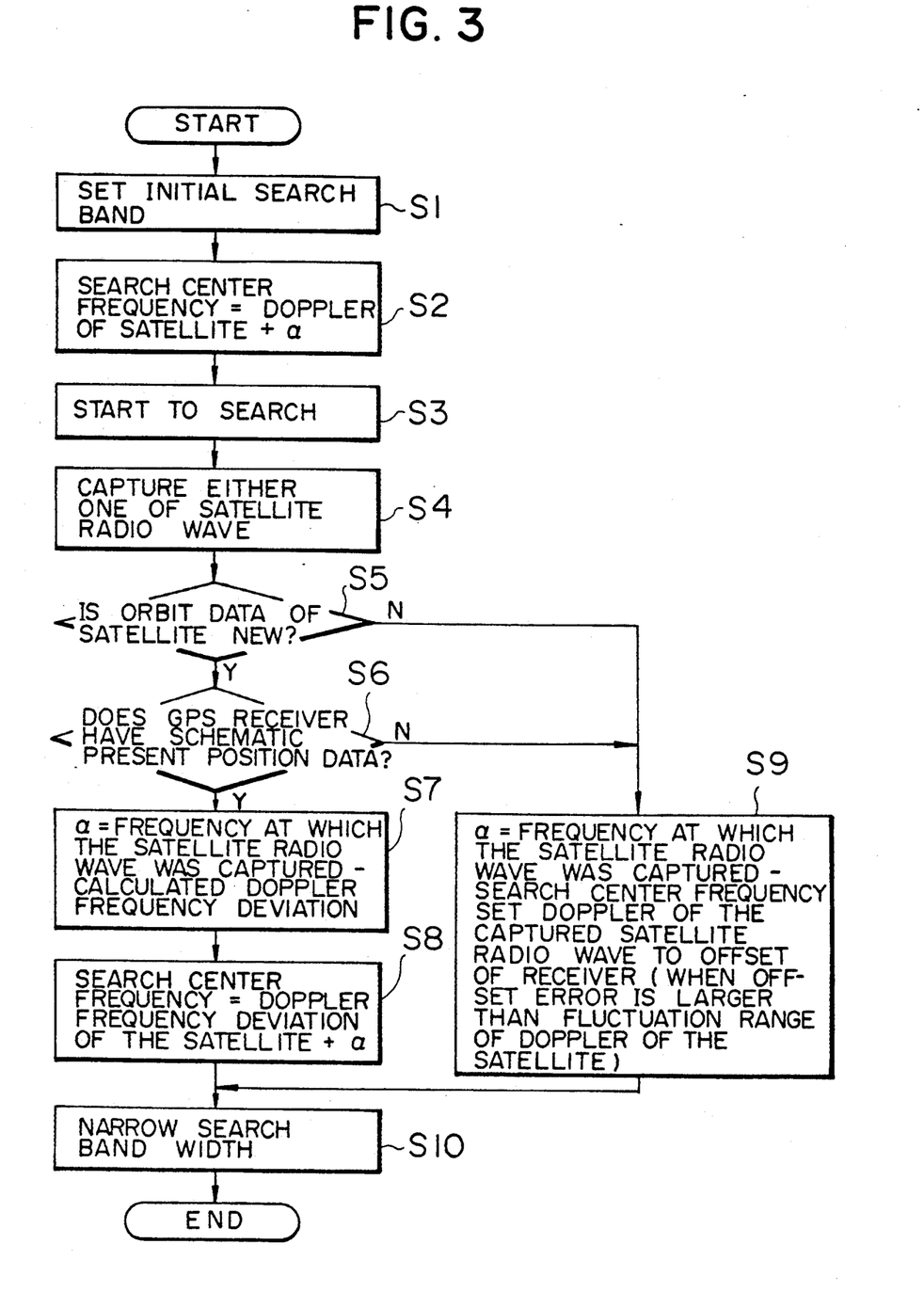
FIG. 3 is an explanatory diagram of a method of calculating an offset value of an oscillator for accomplishing the first aspect of the invention.

FIG. 2 is an explanatory diagram of a switching operation of a search frequency according to an embodiment of a satellite radio wave capturing method of the first aspect of the present invention. FIG. 3 is a flowchart for the operation. The embodiment relates to an example of the case where three channels $CH_1$ to $CH_3$ are used and three satellites are simultaneously searched in parallel as shown in FIG. 2(B). FIG. 2(A) shows a search state of the satellite with regard to the channel $CH_2$ among the three channels.

When the power source of the GPS receiver is turned on, the satellite radio wave to be captured is allocated to each channel and an initial search band width for each satellite is set (step S1 in FIG. 3). The initial search band width is set to a wide band as shown in FIG. 2(A) since the accurate received frequency position of the satellite is still obscure.

Subsequently, with respect to the channels, search center frequencies $f_{S1}$ to $f_{S3}$ of the satellite radio waves to be captured are set by using Doppler frequency deviations $\Delta f_{d1}$ to $\Delta f_{d3}$ calculated with respect to the respective satellites and a prepared correction value $\alpha$ (step S2). In the embodiment, the correction value $\alpha$ assumes "0" and, for example, in case of the channel $CH_2$, the initial search center frequency $f_{S2}$ is set to the position that is shifted from the reference received frequency $f_0$ (1575.42 MHz) by a frequency corresponding to only the Doppler frequency deviation $\Delta f_{d2}$ of the captured satellite radio wave of the channel $CH_2$ as shown in FIG. 2(A).

After the search band widths and the initial search center frequency were set as mentioned above, the searching operations of the satellite radio waves to be captured are simultaneously started in parallel every channel (step S3). That is, as shown in FIG. 2(A), the GPS receiver searches the satellite radio wave while shifting the oscillating frequency one step by one to high and low frequency sides while setting a capture range (for example, 300 [Hz]) of the oscillator to one step width.

It is now assumed that the first satellite radio wave was captured at time $t_1$ in either one of the channels, for instance, in the channel $CH_1$ (step S4). An actual received frequency of the first captured satellite radio wave now assumes $f_{r1}$ (refer to FIG. 2(B)).

When the first satellite radio wave is captured, the GPS satellite checks in step S5 to see if the orbit data of the satellite is new or not. If YES, step S6 follows. When the orbit data is old, step S9 follows. In step S6, a check is further made to see if the GPS receiver has the schematic present position data or not. If YES, step S7 follows. If NO, step S9 follows.

When the orbit data of the satellite is new and the GPS receiver has the schematic present position data, in step S7, the accurate offset value $\Delta f_{OSC}$ of the oscillator at the time point at which the satellite radio wave was first captured is calculated from the received frequency $f_{T1}$ of the first captured satellite radio wave and the calculated offset value $\Delta f_{OSC}$ is set as a new correction value $\alpha$.

In step S8, the search center frequencies $f_{S2}$ and $f_{S3}$ of the satellite radio waves of the other channels CH$_2$ and CH$_3$ which are not yet captured are reset by using the new correction value $\alpha = \Delta f_{OSC}$. For instance, in case of the channel CH$_2$, as shown in FIG. 2(A), the new search center frequency $f_{S2}$ is reset to the position of $f_0 + \Delta f_{d2} + \Delta f_{OSC}$.

After the search center frequency was reset, in step S10, the search band width is changed from the wide band to the narrow band and the search of the satellite is again continued. For example, in case of the channel CH$_2$, as shown in FIG. 2(A), the search is continued at a predetermined narrow band width around the newly reset search center frequency $f_{S2}$ as a center. The reason why the search band width is changed from the wide band to the narrow band is because since it is presumed that the search center frequency $f_{S2}$ which has newly been reset as mentioned above has a value which is extremely close to the actual received frequency $f_{r2}$ (refer to FIG. 2(B)), there is no need to search over a wide frequency range.

When the search center frequencies of the second and subsequent satellite radio waves to be captured are reset by using the offset value of the oscillator which has been calculated from the first captured satellite radio wave as mentioned above, the newly set search center frequencies of the satellites are located at positions which are extremely close to the actual received frequencies, so that each satellite radio wave can be captured in a short time.

When the orbit data of the satellite is old in step S5, or when the GPS receiver does not have the schematic present position data in step S6, the accurate offset value $\Delta f_{OSC}$ of the oscillator cannot be calculated. Therefore, the processing routine advances to step S9 and the received frequency $f_{r1}$ of the first captured satellite radio wave is set as new search center frequencies $f_{S2}$ and $f_{S3}$ of the other satellites. In step S10, the search band width is changed to the narrow band and, after that, the search of the satellite radio wave is again continued.

In step S9, when the offset error of the oscillator which is used is larger than the Doppler frequency deviation of the satellite, the Doppler frequency deviation $\Delta f_{d1}$ of the first captured satellite radio wave is substituted as an offset value $\Delta f_{OSC}$ of the oscillator and the frequency $(f_{r1} + \Delta f_{d1})$ is set as new search center frequencies $f_{S2}$ and $f_{S3}$ of the satellites.

Although the above embodiment has been described with respect to the case of simultaneously searching a plurality of satellites in parallel by using a plurality of channels, the present invention can be also similarly applied to the case of what is called a sequential search such that a plurality of satellites are sequentially searched by using one channel.

As will be obviously understood from the above description, according to the first aspect of the present invention, the offset value of the oscillator of the GPS receiver is calculated by subtracting the Doppler frequency deviation of the first captured satellite radio wave from the actual received frequency of the first captured satellite radio wave. With respect to the second and subsequent satellite radio waves to be captured, the search center frequencies are reset by using the offset value calculated. The search center frequencies of the second and subsequent satellite radio waves to be captured, therefore, can be set to frequencies which are extremely close to the actual received frequencies. Even in case of using an oscillator of a low accuracy, the capturing times of a plurality of satellite radio waves which are necessary for the position measurement can be reduced as a whole. Since the oscillator of a low accuracy can be used, the costs of the GPS receiver can be reduced.

An embodiment according to the second aspect of the present invention will now be described. In case of the invention, when the power source of the GPS receiver is turned off after completion of the position measurement, the GPS receiver stores the offset value $\Delta f_{OSC}$ of the oscillator obtained at last of the position measurement into a memory for a backup and also starts a counting operation of the elapsed time from the power-OFF time point as a start point (hereinafter, referred to as "OFF time") by using an internal clock.

Figure 4:
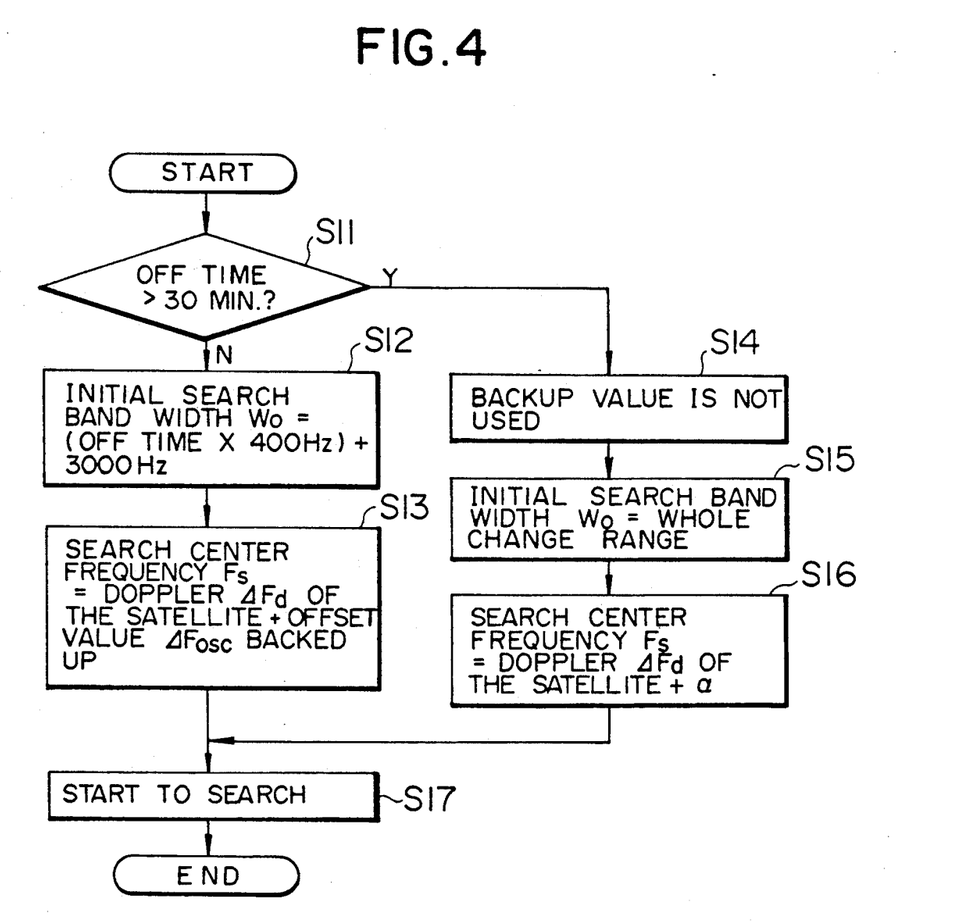
FIG. 4 is a flowchart showing an embodiment according to the second aspect of the invention.

When the power source of the GPS receiver is turned on for the position measurement in a state in which the GPS receiver is counting the OFF time, the GPS receiver detects the OFF time for an interval from the power-OFF at the preceding position measurement to the power-ON for the present position measurement, thereby judging whether the OFF time exceeds a predetermined time, for instance, 30 minutes or not (step S11 in FIG. 4).

When the OFF time does not exceed 30 minutes, it is regarded that the offset value of the present oscillator is not so largely changed from the offset value obtained at the preceding position measurement, so that the processing routine advance to step S12. When the OFF time exceeds 30 minutes, it is regarded that the offset value of the present oscillator is largely changed from the offset value obtained at the preceding position measurement, so that the processing routine advances to step S14.

Figure 5:
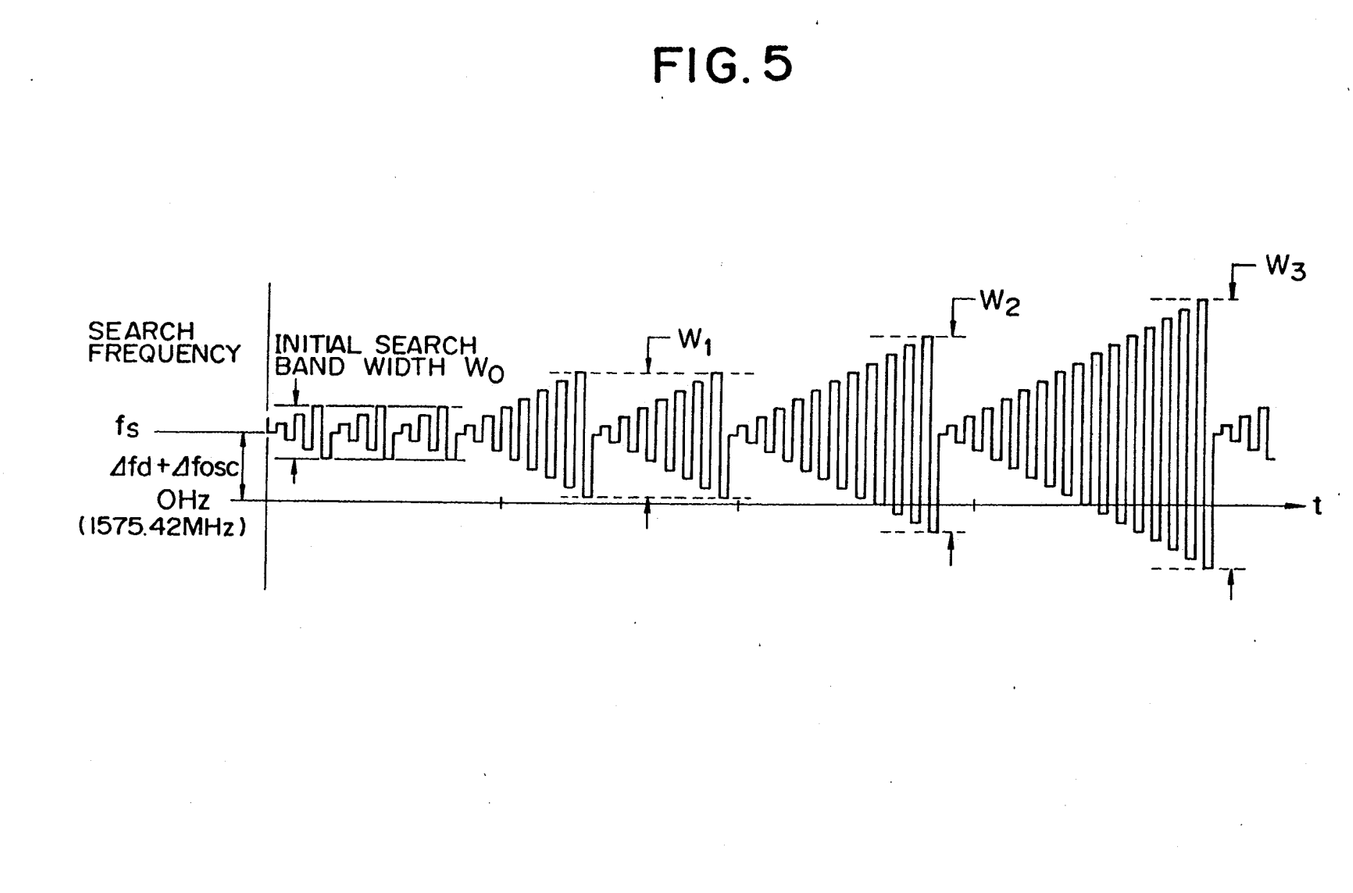
FIG. 5 is an explanatory diagram of a switching operation of a search frequency in case of a short OFF time according to the second aspect of the invention.
Figure 6:
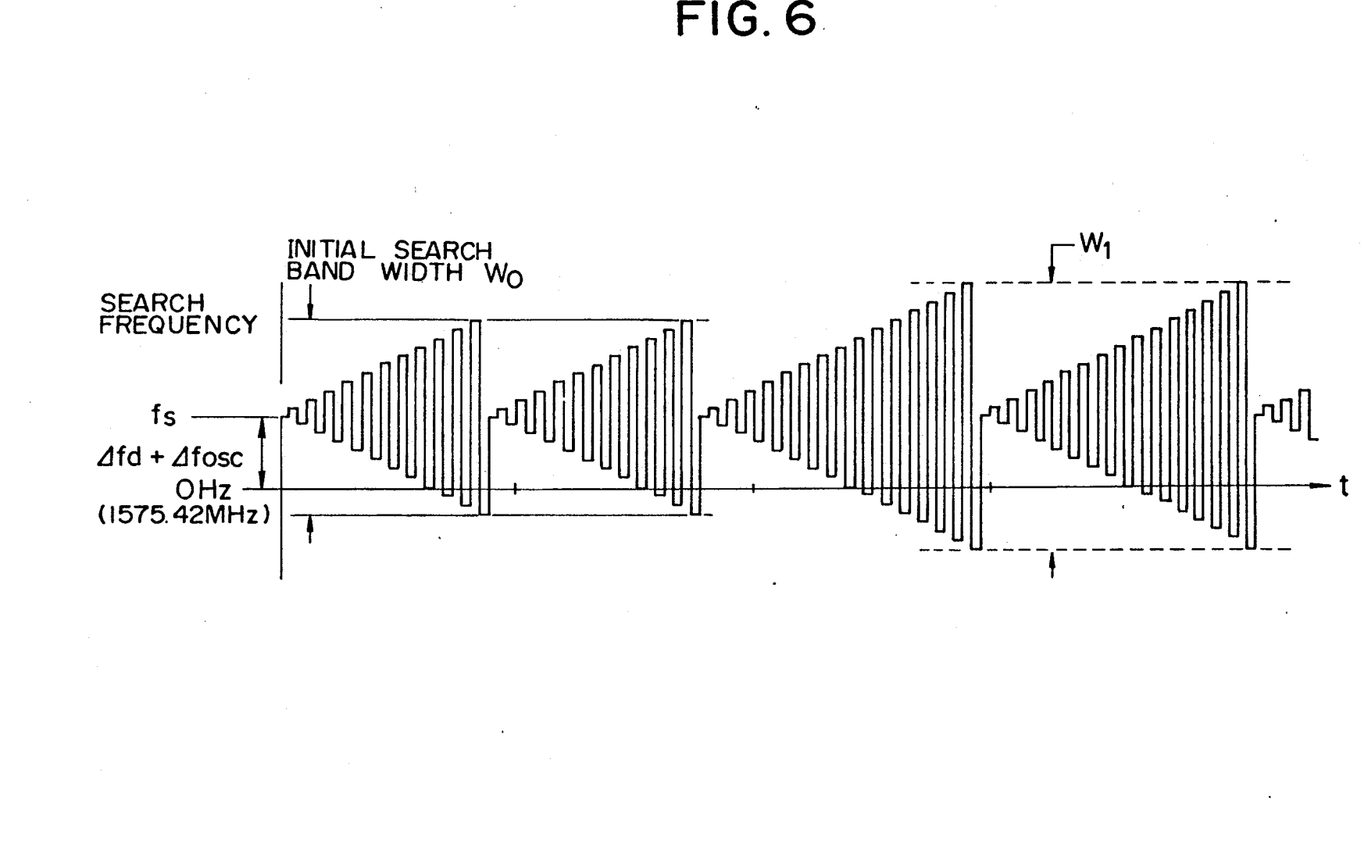
FIG. 6 is an explanatory diagram of a switching operation of a search frequency in case of a long OFF time according to the second aspect of the invention.

When the OFF time is equal to or shorter than 30 minutes, an initial search band width W$_0$ is set into a band width in step S12. That is, in the embodiment of FIG. 4, the initial search band width W$_0$ is variably set in accordance with the duration of the OFF time. The fundamental band width is set to 3000 [Hz] and the value which is obtained by adding (OFF time × 400 Hz) to the fundamental band width is set as an initial search band width W$_0$. FIGS. 5 and 6 show setting states of the initial search band width W$_0$. FIG. 5 corresponds to the case of a short OFF time and FIG. 6 corresponds to the case of a long OFF time as mentioned above.

In step S13, the search center frequency $f_s$ to capture the satellite radio wave is set. That is, the search center frequency $f_s$ is set as $f_s = \Delta f_d + \Delta f_{OSC}$ by using the Doppler frequency deviation $\Delta f_d$ of the satellite obtained by the calculation from the orbit data of the target satellite and the schematic present position data and the offset value $\Delta f_{OSC}$ at the preceding position measurement which has been backed up in the memory. As orbit data of the satellite and schematic present position data, it is sufficient to use the almanac information derived at the preceding position measurement and the present position information obtained at the preceding position measurement. FIGS. 5 and 6 show the setting states of the search center frequency $f_s$.

After the initial search band $W_0$ and the search center frequency $f_s$ were set as mentioned above, the search of the target satellite is started (step S17). As shown in FIGS. 5 and 6, the capture range is set to one step width and the above search is executed while shifting the oscillating frequency of the oscillator one step by one within the initial search band width $W_0$ to the high and low frequency sides.

The above searching operation is repeated within the initial search bend width $W_0$ a predetermined number of times (three times in FIG. 5 or two times in FIG. 6) or for a predetermined time. This is because, when considering a GPS receiver which is mounted in a car as an example, there is a case where the car happens to enter the shadow of a building at the time of the first search and the satellite radio wave cannot be captured or the like, and it is necessary to cope with such a case.

When the radio wave of the target satellite cannot be captured within the initial search band width $W_0$, it is presumed that the radio wave exists out of the initial search band width $W_0$. Therefore, at the next search repetition and subsequent search repeating operations, as shown in FIGS. 5 and 6, the satellite radio wave is searched while gradually widening the search band width like $W_1$, $W_2$, and $W_3$.

As mentioned above, first, the search center frequency $f_s$ at which a probability of the existence of the satellite radio wave is highest is set to a center and the satellite radio wave is searched in the narrow band mode by the initial search band width $W_0$. Only in the case where the satellite radio wave cannot be captured within the initial search band width $W_0$, the search band is widened and the satellite radio wave is searched. Due to this, even in case of using the oscillator of a low accuracy, the radio wave of the target satellite can be captured in a short time.

When the OFF time exceeds 30 minutes in step S11, the processing routine advances to step S14. In this case, a fairly long time has elapsed from the preceding position measurement and it is regarded that the offset value of the oscillator has largely been changed from the offset value at the preceding position measurement, so that the use of the offset value at the preceding position measurement which has been backed up in the memory is stopped.

A whole range of the fluctuation of the offset value of the oscillator in this case is set as an initial search band width $W_0$ (step S15). The search center frequency $f_s$ is set by using the Doppler frequency deviation $\Delta f_d$ obtained by the calculation and the prepared fixed offset value $\alpha$ (for instance, the intermediate value of the maximum offset change or the like) (step S16). After that, the radio wave search of the target satellite is started (step S17) in a manner similar to that mentioned above.

In the above embodiment, although the time of 30 minutes has been used as a time to judge the duration of the OFF time, such a time value can arbitrarily be used in accordance with the specification of the apparatus and is merely shown as an example. In the above embodiment, although the initial search band width $W_0$ at the start of the search has been variably set in proportion to the duration of the OFF time, such a time can be also set to a predetermined narrow band width.

As will be obviously understood from the above description, according to the second aspect of the present invention, when the method of setting the initial offset value of the oscillator is used, the elapsed time which is required from the power-OFF of the GPS receiver at the preceding position measurement to the power-ON of the GPS receiver at the present position measurement is measured. On the basis of the duration of the elapsed time, determination is made with regard to whether the offset value of the oscillator at the preceding position measurement which has been stored in the memory in the GPS receiver is used as an offset value of the oscillator at the present position measurement or not. Even in case of using the oscillator of a low accuracy, therefore, the offset value at the preceding position measurement which has been backed up in the memory can be effectively used and the satellite radio wave can be promptly captured.

Figure 7:
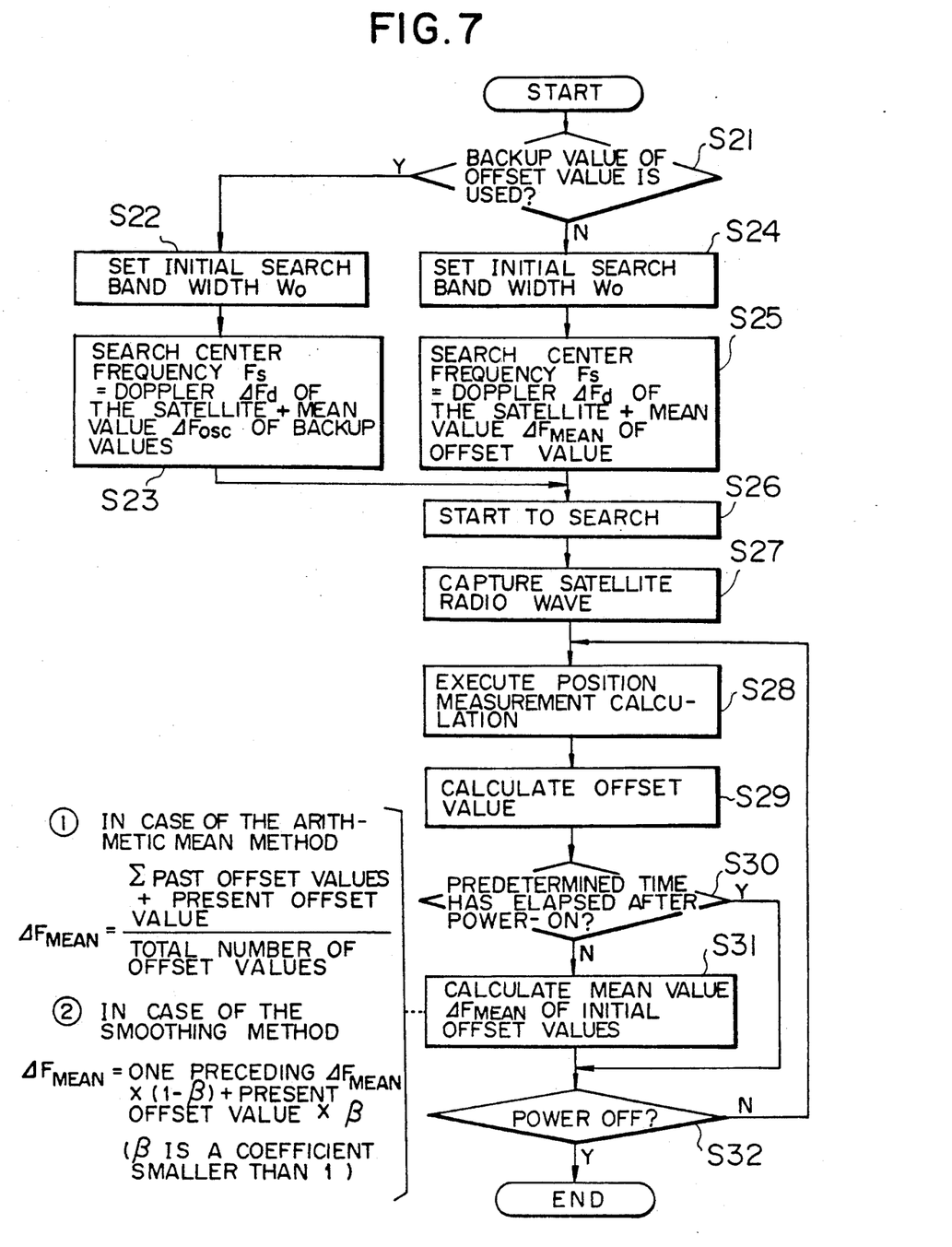
FIG. 7 is a flowchart showing an embodiment according to the third aspect of the invention.

An embodiment according to the third aspect of the present invention will now be described. When the power source of the GPS receiver is now turned on to execute the position measurement, the GPS receiver judges whether the offset value $\Delta f_{OSC}$ of the oscillator which has been obtained at last in the preceding position measurement and has been backed up in the memory is used as an initial offset value for the present position measurement or not (step S21 in FIG. 7). In case of using the backup value as an initial offset value of the present position measurement, the processing routine advances to step S22. If NO in step S21, step S24 follows.

When the offset value $\Delta f_{OSC}$ which has been backed up is used as an initial offset value for the present position measurement, the initial search band width $W_0$ at the start of the search is set in step S22. After that, the search center frequency $f_s$ is set in step S23. The search center frequency $f_s$ in this case is set as $f_s = \Delta f_d + \Delta f_{OSC}$ by using the Doppler frequency deviation $\Delta f_d$ of the target satellite obtained by the calculation and the offset value $\Delta f_{OSC}$ of the oscillator which has been obtained at last in the preceding position measurement and has been backed up in the memory.

On the other hand, in the case where the offset value $\Delta f_{OSC}$ which has been backed up in the memory is not used as an initial offset value for the present position measurement, the initial search band width $W_0$ is set in step S24. After that, the search center frequency $f_s$ is set in step S25. The search center frequency $f_s$ in this case is set as $f_s = \Delta f_d + \Delta f_{mean}$ by using the Doppler frequency deviation $\Delta f_d$ of the target satellite obtained by the calculation and a mean value $\Delta f_{mean}$ of a plurality of offset values calculated by an arithmetic operating process similar to step S31, which will be explained hereinlater, at the preceding power-ON because the offset value $\Delta f_{OSC}$ obtained at last in the preceding position measurement cannot be used.

Figure 8:
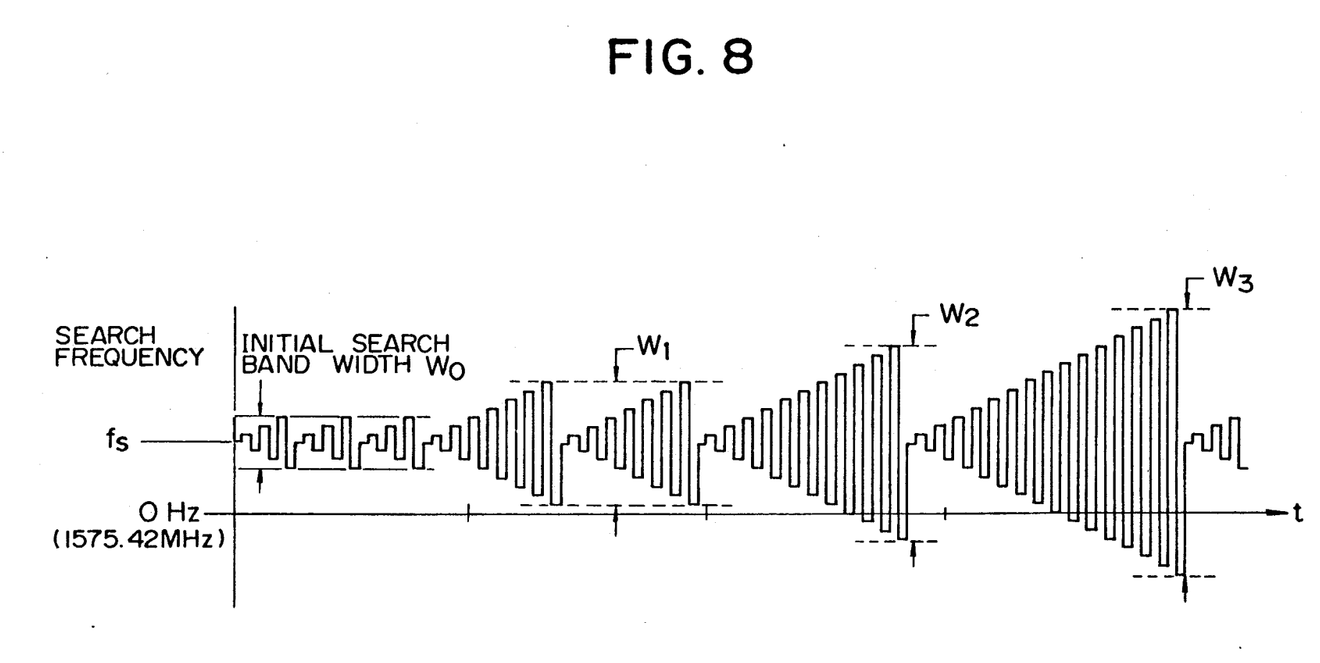
FIG. 8 is an explanatory diagram of a method of calculating an offset value of an oscillator for accomplishing the third aspect of the invention.

After the initial search band width $W_0$ and the search center frequency $f_s$ were set as mentioned above, as shown in FIG. 8, the search center frequency $f_s$ is set to a start point and the radio wave search of the target satellite is started while shifting the oscillating frequency to the high and low frequency sides within the initial search band width $W_0$ (step S26). When the radio wave the target satellite cannot be captured even by searching the initial search band width $W_0$ a desired number of times (two times in the example of FIG. 8), the searching operation is subsequently repeated while gradually widening the search band width like $W_1$, $W_2$, and $W_3$.

When radio waves from a plurality of satellites which are necessary for the position measurement are completely captured in step S27, the accurate present position of the GPS receiver is calculated by using the navigation data of each satellite in step S28. After the actual offset value of the oscillator at that time point was calculated in step S29, a check is made in step S30 to see if a predetermined time (for instance, five minutes) has elapsed from the power-ON of the receiver or not.

When it is determined in step S30 that the predetermined time does not elapse yet, the processing routine advances to step S31. In step S31, new mean value $\Delta f_{mean}$ is again calculated by using the offset value of the oscillator obtained in step S29 and is stored into the memory. The above operation is repeated until the predetermined time elapses. The foregoing arithmetic mean calculating method, a smoothing method, or the like can be used as a method of calculating the mean value $\Delta f_{mean}$.

When it is decided in step S30 that the predetermined time has elapsed, the processing routine advances to step S32 and the position measurement of the present position in step S28 and the calculation of the offset value of the oscillator in step S29 as mentioned above are repeated until the power source of the receiver is turned off.

When the power source of the receiver is turned off and the position measurement is finished (step S32), the last offset value calculated in step S29 just before the power-OFF is held as a backup value in the memory in the receiver. Further, the mean value $\Delta f_{mean}$ of a plurality of offset values calculated at last in step S31 is held as an initial offset value for the next position measurement.

In the above embodiment, although the offset values before and after the power-OFF are used in accordance with the conditions, it is also possible to always use only a mean value.

As will be obviously understood from the above description, according to the third aspect of the present invention, the mean value of a plurality of offset values obtained within a predetermined time just after the power-ON of the receiver is calculated and stored in the memory, and at the next power-ON, the mean value of the offset values stored in the memory is used as an initial offset value at the start of the next position measurement. Even in case of using the oscillator of a low accuracy, therefore, the search center frequency can be set to a value that is closer to the actual received frequency and the capturing time of the satellite radio wave can be reduced by a time corresponding to such a close search center frequency.

What is claimed is:

1. A satellite radio wave capturing method for a Global Positioning System (GPS) receiver, in which a search center frequency is set for every satellite radio wave to be captured and an oscillating frequency of an oscillator in said GPS receiver is changed using said set search center frequency as a reference, thereby capturing a radio wave of a target satellite, comprising the steps of:

calculating an offset value of said oscillator by subtracting a Doppler frequency deviation of a first captured satellite radio wave from an actual received frequency of said first captured satellite radio wave; and resetting said search center frequency using said calculated offset value with respect to second and subsequent satellite radio waves to be captured.

2. A satellite radio wave capturing method for a Global Positioning System (GPS) receiver, in which a search center frequency is set using an offset value of an oscillator in said GPS receiver and a Doppler frequency deviation of a target satellite and an oscillating frequency of said oscillator is changed using said set search center frequency as a reference, thereby capturing a radio wave of a target satellite, comprising the steps of:

measuring an elapsed time from a power-OFF of said GPS receiver at a preceding position measurement by said GPS receiver to a power-ON of said GPS receiver at a present position measurement; and on the basis of a duration of said measured elapsed time, determining whether or not an offset value of said oscillator at a preceding position measurement stored in a memory in said GPS receiver is used as an offset value of said oscillator at said present position measurement.

3. A satellite radio wave capturing method for a Global Positioning System (GPS) receiver, in which a search center frequency is set using an offset value of an oscillator in said GPS receiver and a Doppler frequency deviation of a target satellite and an oscillating frequency of said oscillator is changed using said set search center frequency as a reference, thereby capturing a radio wave of a target satellite, comprising the steps of:

calculating a mean value of a plurality of offset values obtained within a predetermined time just after a power-ON of said GPS receiver and storing said mean value; and using said stored mean value of said offset values as an initial offset value at a start of position measurement at a time of a next power-ON of said GPS receiver.

* * * * *